US006298986B1

United States Patent
Chang

(10) Patent No.: US 6,298,986 B1
(45) Date of Patent: Oct. 9, 2001

(54) COMPACT DISK RECEIVING DEVICE

(76) Inventor: Kun-Fa Chang, No. 14, Zen-Hsing Rd., Da-Ya Hsiang, Taichung Hsien (TW)

( * ) Notice: Subject to any disclaimer, the term of this patent is extended or adjusted under 35 U.S.C. 154(b) by 25 days.

(21) Appl. No.: 09/596,871

(22) Filed: Jun. 19, 2000

(51) Int. Cl.[7] .................................................. B65D 85/57
(52) U.S. Cl. ........................................ 206/310; 206/308.1
(58) Field of Search ................................ 206/307, 308.1, 206/309–313, 493

(56) References Cited

U.S. PATENT DOCUMENTS

| | | | |
|---|---|---|---|
| 5,251,750 | * 10/1993 | Gelardi et al. | 206/310 |
| 5,685,425 | * 11/1997 | Choi | 206/310 |
| 5,713,463 | * 2/1998 | Lakoski et al. | 206/308.1 |
| 5,988,375 | * 11/1999 | Chang | 206/308.1 |
| 5,996,788 | * 12/1999 | Belden, Jr. et al. | 206/310 |
| 6,065,594 | * 5/2000 | Sankey et al. | 206/310 |

FOREIGN PATENT DOCUMENTS

88/06559 * 9/1988 (WO) ................................ 206/308.1

* cited by examiner

Primary Examiner—Luan R. Bui

(57) ABSTRACT

A compact disk receiving device includes a base and a cover pivotally connected to the base. Two recesses are defined in a top surface of the base and a protrusion is connected to an inside of each of the two recesses. Each the protrusion has an extension portion extending therefrom and a gap is defined between the protrusion and the extension portion so that the extension portion is able to be pushed to narrow the gap. Each extension portion has a ridge extending from an outside thereof so that the two ridges are engaged with an inner periphery of a central hole of a compact disk. When pushing the two protrusions toward with each other, a distance between the two ridges is shortened to allow the two protrusions to be inserted in the central hole of a compact disk.

2 Claims, 6 Drawing Sheets

COMPACT DISK RECEIVING DEVICE

FIELD OF THE INVENTION

The present invention relates to a receiving device, and more particularly, to a compact disk receiving device which has two protrusions on a base and a cover pivotally connected to the base. Each protrusion has a ridge so as to engage with an inner periphery of a central hole of a compact disk.

BACKGROUND OF THE INVENTION

A conventional compact disk receiving device generally includes a base 10 and a cover pivotally connected to a side of the base 10. An engaging means 11 composed of twelve pieces of plates 12 extends from a top of the base 10. Each plate 12 is in a form of Z-shape and is made of flexible material so that the twelve plates 12 are located as a circular ring and an outer diameter of the ring is slightly larger than an inner periphery defining a central hole of a compact disk. When positioning a compact disk to the base 10, the user simply presses the compact disk downward to let the central hole of the compact disk engage with the engaging means 11. The plates 12 are forced to move downward and inward to narrow the outer diameter of the circular ring composed of the plates 12 so that the plates 12 are engaged with the central hole of the compact disk. When releasing the compact disk, the plates 12 bounce back and engage the central hole. When separating the compact disk from the engaging means 11, the user presses the plates 12 to narrow the circular ring to pick the compact disk. Nevertheless, some of the plates 12 may not be pressed by the user's finger so that these plates 12 still engage with the central hole of the compact disk. When removing the compact disk from the engaging means 11, these plates 12 that are not pressed could be broken or the compact disk is not separated from the plates 12.

The present invention intends to provide a compact disk receiving device that includes only two protrusions to engage with the central hole of a compact disk so as to eliminate the shortcomings of the conventional compact disk receiving device.

SUMMARY OF THE INVENTION

In accordance with one aspect of the present invention, there is provided a compact disk receiving device and comprising a base having two recesses defined in a top surface thereof and a cover is pivotally connected to the base. A protrusion is connected to an inside of each of the two recesses and each the protrusion has an extension portion extending therefrom. A gap is defined between the protrusion and the extension portion. Each extension portion has a ridge extending from an outside thereof.

The object of the present invention is to provide a compact disk receiving device which has only two protrusions to hold the compact disk in position.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
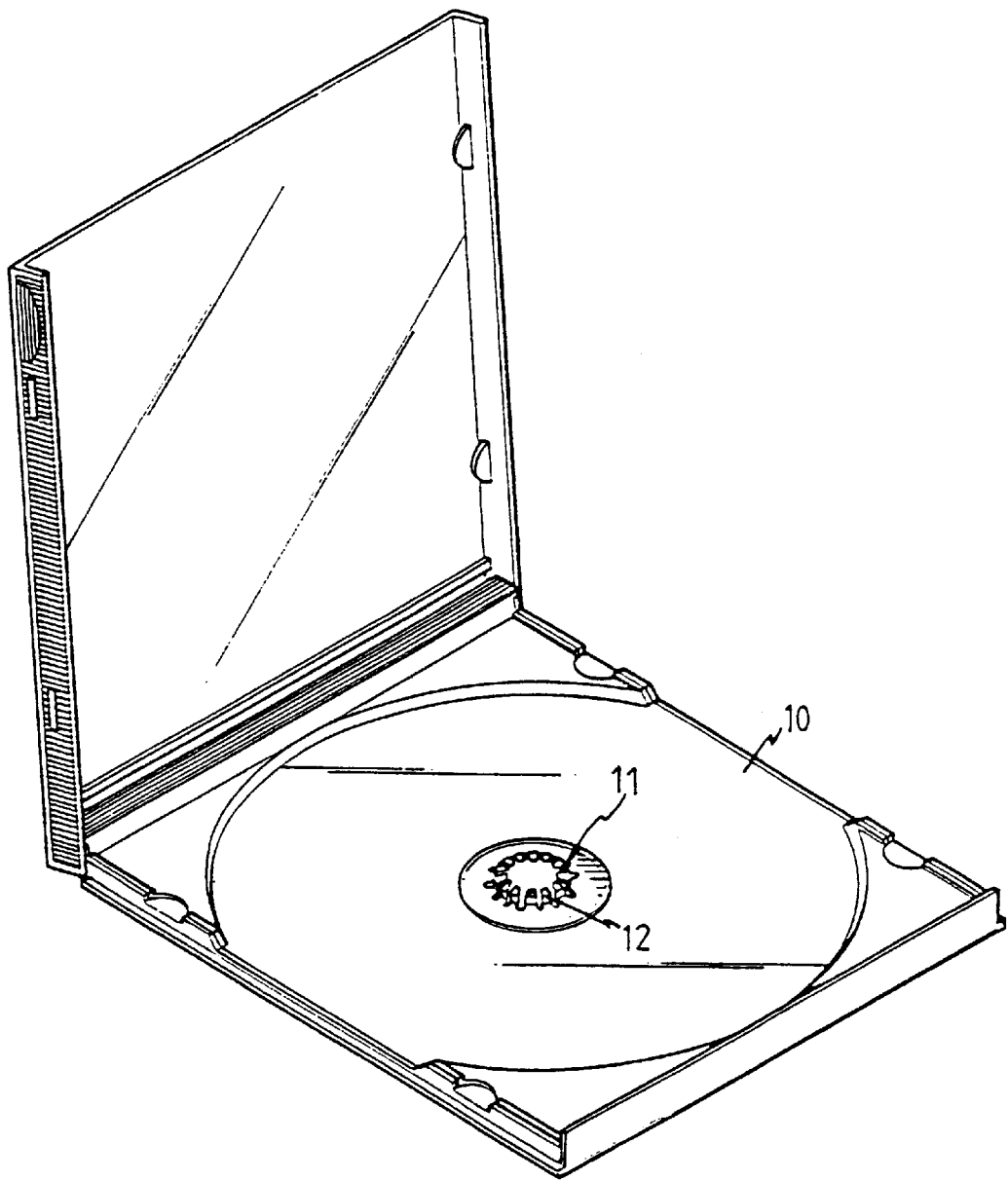
FIG. 1 is a perspective view to show a conventional compact disk receiving device.
Figure 2:
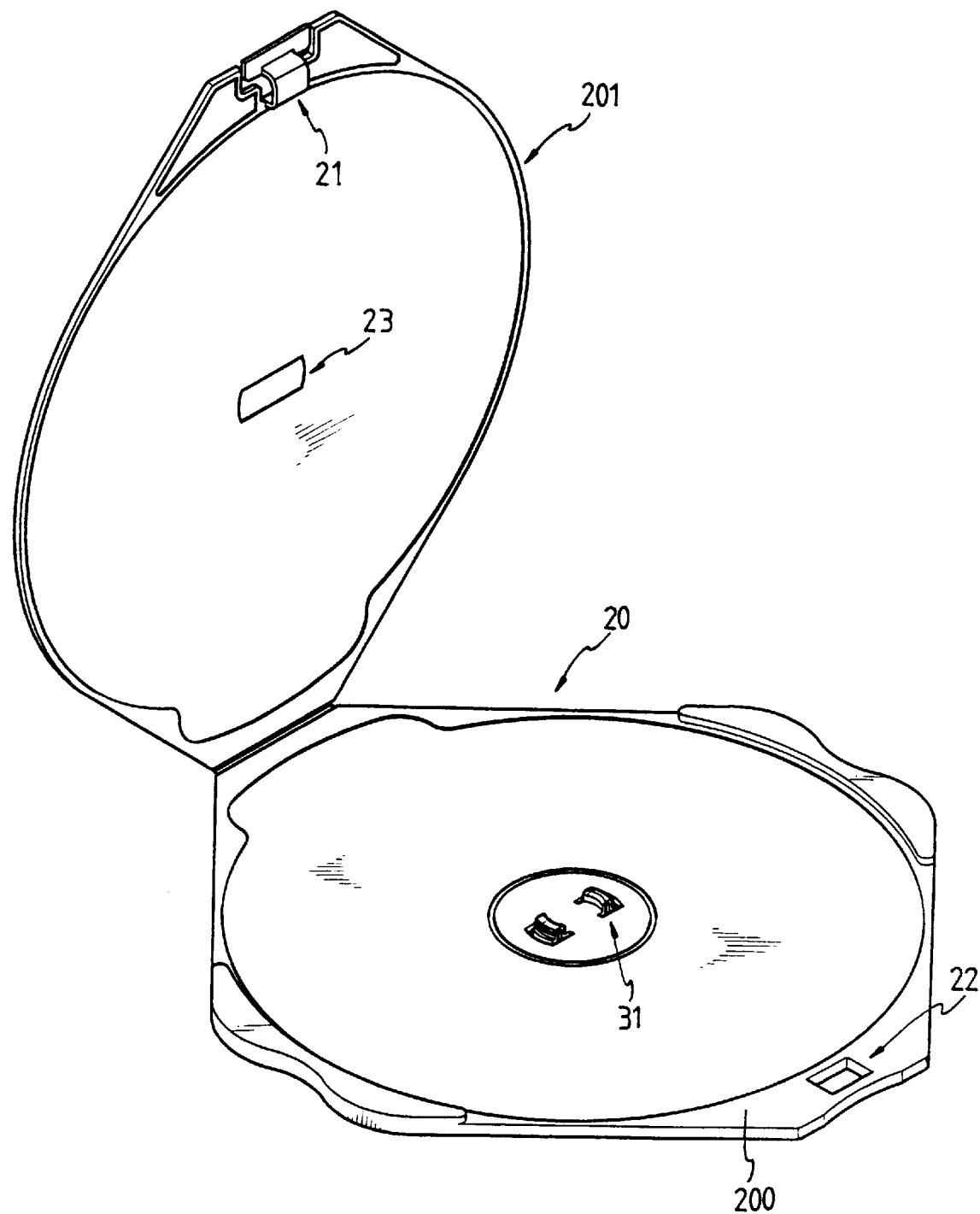
FIG. 2 is a perspective view to show a compact disk receiving device of the present invention.
Figure 3:
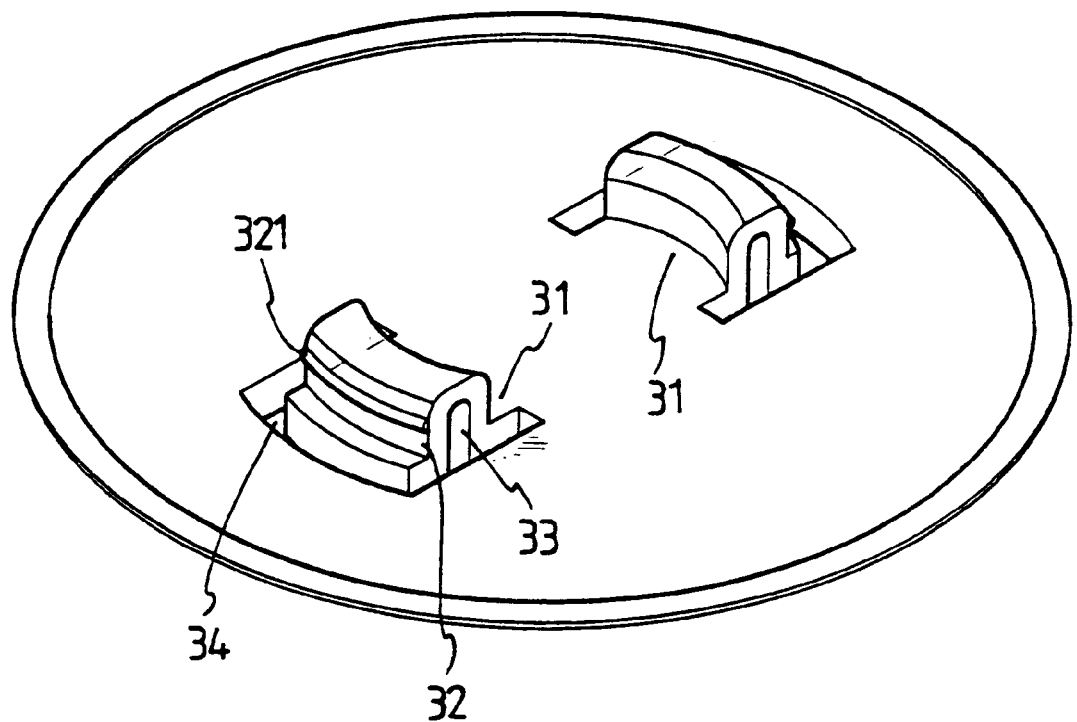
FIG. 3 is a perspective view to show two protrusions extending from the base of the compact disk receiving device of the present invention.
Figure 4:
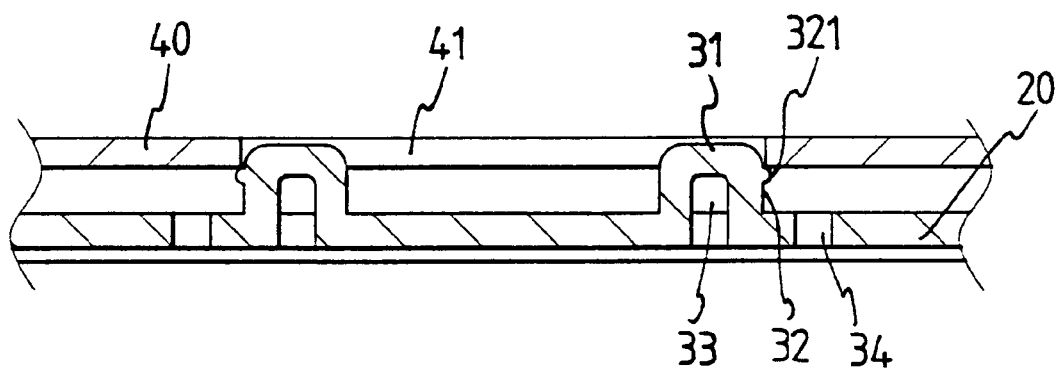
FIG. 4 is a cross sectional view to show when a compact disk is to be engaged with the two protrusions of the present invention.

Referring to FIGS. 2 to 4, the compact disk receiving device in accordance with the present invention comprises a base 20 having two recesses 34 defined in a top surface thereof and a flange 200 extends from a periphery of the base 20. An engaging aperture 22 is defined through the flange 200. A cover 201 is pivotally connected to the base 20. A protrusion 31 is connected to an inside of each of the two recesses 34 and the protrusions 31 extend over the top surface of the base 20. Each the protrusion 31 has an extension portion 32 extending therefrom and a gap 33 is defined between the protrusion 31 and the extension portion 32 so that the extension portion 32 is flexible when being pushing to narrow the gap 33. Each extension portion 32 has a ridge 321 extending from an outside thereof A distance between the two ridges 321 is slightly longer than an inner periphery defining a central hole 41 of a compact disk 40.

A notch 23 is defined in an underside of the cover 201 and the notch 23 is sized to receive the two protrusions 31. A locking member 21 extends from the cover 20 and is able to be disengagably engaged with the engaging aperture 22 to receive the compact disk 40 in the receiving device.

Figure 5:
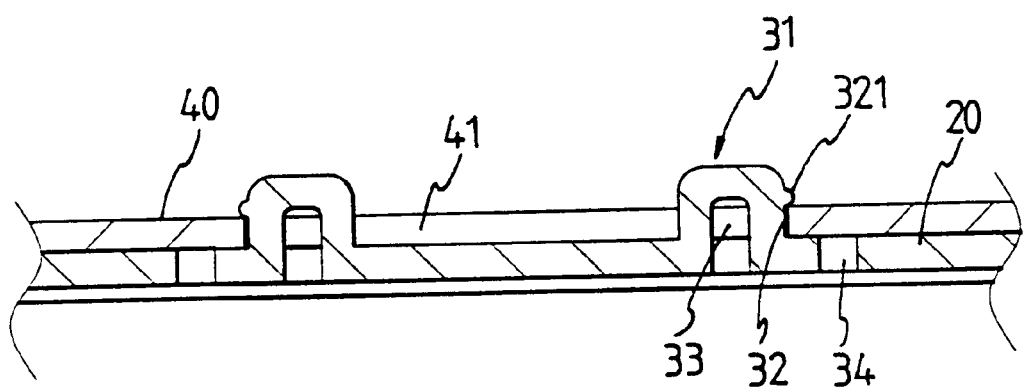
FIG. 5 is a cross sectional view to show a compact disk is engaged with the two protrusions of the present invention.

Referring to FIG. 4, when putting the compact disk 40 in the compact disk receiving device, the two protrusions 31 are engaged with the inner periphery of the central hole 41 of the compact disk 40, and then pushing the compact disk 40 downward to let the inner periphery of the central hole 41 push the two ridges 321 and then force the two extension portions 32 toward with each other till the inner periphery defining the central hole 41 of the compact disk 40 passes over the two ridges 321 as shown in FIG. 5. By this way, the compact disk 40 is positioned.

Figure 6:
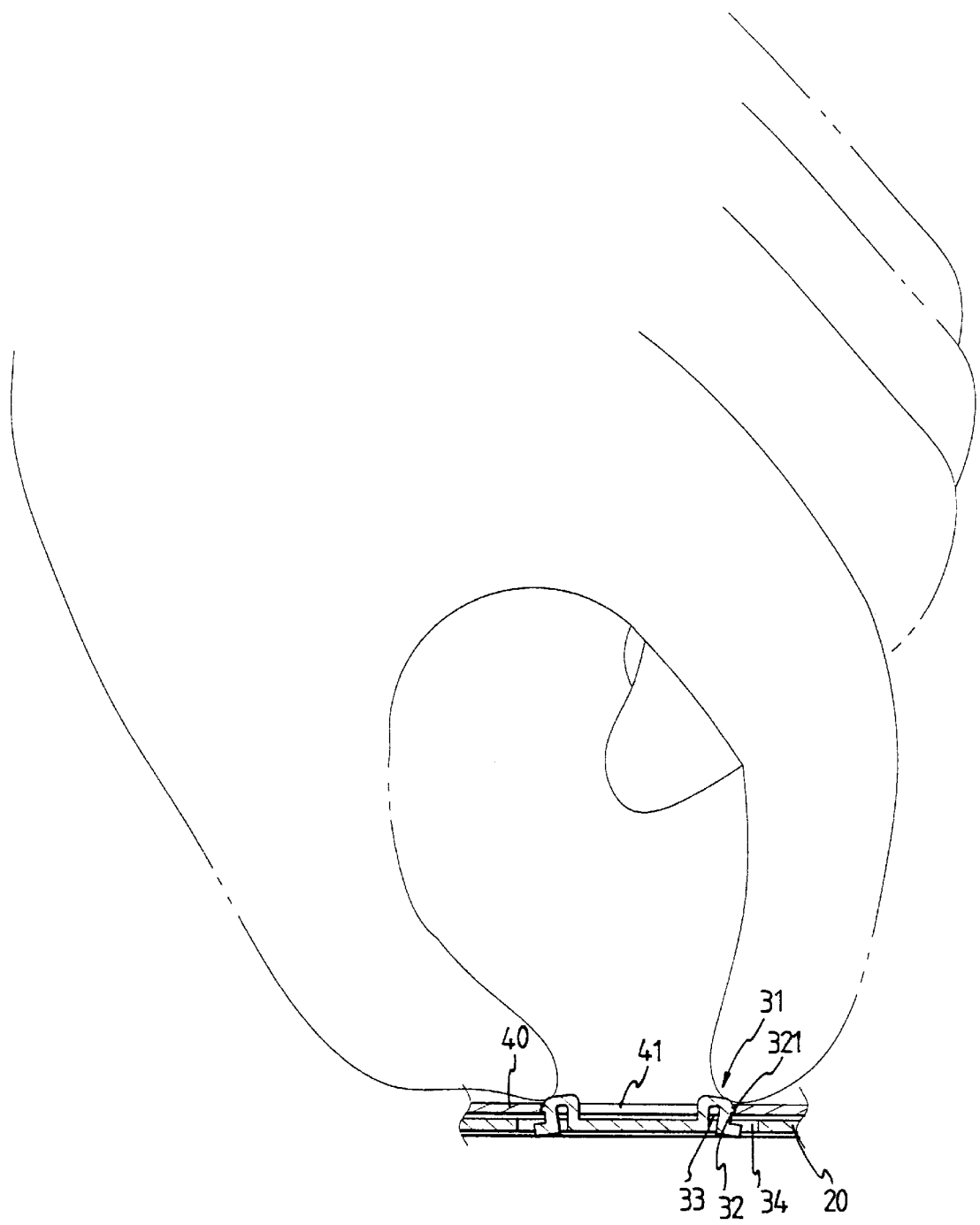
FIG. 6 is an illustrative view to show two user's fingers push the two protrusions toward with each other.

As shown in FIG. 6, when taking the compact disk 40 from the two protrusions 31, two fingers of the user push the two extension portions 32 toward with each other to shorten the distance between the two ridges 321 so that the two ridges 321 are disengaged from the central hole 41 of the compact disk 40. There are only two protrusions 31 to be pushed when taking the compact disk 40 from the device so that the shortcomings happened on the conventional compact disk receiving device can be overcome.

While we have shown and described various embodiments in accordance with the present invention, it should be clear to those skilled in the art that further embodiments may be made without departing from the scope and spirit of the present invention.

What is claimed is:

1. A compact disk receiving device comprising:

a base having two recesses defined in a top surface of said base and a protrusion connected to an inside of each of said two recesses, each said protrusion extending over a top surface of said base in a form of a straight wall, an extension portion extending from a distal end of each said straight wall and toward said top surface of said base to form another straight wall, a gap defined between said straight wall of said protrusion and said straight wall of said extension portion so that said extension portion is flexible when being pushing to narrow said gap, each extension portion having a ridge extending from an outside thereof, and a cover pivotally connected to said base and a notch defined in an underside of said cover, said notch being sized to receive said two protrusions.

2. The device as claimed in claim 1 further comprising a flange extending from said base and an engaging aperture defined through said flange, a locking member extending from said cover and engaged with said engaging aperture.

* * * * *